United States Patent [19]

Downie

[11] Patent Number: 4,586,045
[45] Date of Patent: Apr. 29, 1986

[54] WIDE BAND MULTIPLE SIDE-LOBE CANCELLER

[75] Inventor: John W. Downie, Dewitt, N.Y.

[73] Assignee: The United States of America as represented by the Secretary of the Air Force, Washington, D.C.

[21] Appl. No.: 90,196

[22] Filed: Oct. 5, 1970

[51] Int. Cl.[4] .............................................. G01S 7/36
[52] U.S. Cl. .................................................. 343/18 E
[58] Field of Search ........ 343/18 E, 100 LE, 379–382

[56] References Cited

U.S. PATENT DOCUMENTS 4,010,469  3/1977  Marcum ............................ 343/18 E
4,044,359  8/1977  Applebaum et al. ......... 343/18 E X Primary Examiner—T. H. Tubbesing
Attorney, Agent, or Firm—Donald J. Singer; Julian L. Siegel; Harry A. Herbert, Jr.

[57] ABSTRACT

An IF side-lobe canceller having a main channel and a pair of auxiliary channels in which the signal from the main channel is mixed with a stable local oscillator and fed to a subtractor, while in each of the pair of auxiliary channels the signal from an omnidirectional antenna is fed to a mixer and then to the subtractor. The subtractor's output is fed to mixers together with the signals from the omnidirectional antennas. The outputs of these mixers are fed to additional mixers together with the mixed outputs of the stable local oscillator and a second oscillator.

3 Claims, 3 Drawing Figures

WIDE BAND MULTIPLE SIDE-LOBE CANCELLER

BACKGROUND OF THE INVENTION

This invention relates to radar antijamming devices, and more particularly to a multiple side-lobe canceller.

Side-lobe cancellation is a fundamental approach to elimination of jamming from received signals and uses jammer location to eliminate jamming signals and in effect maintains a null in the radar antenna receiver pattern in the direction of the jammer which is accomplished by using an omnidirectional antenna or antennas adjacent to the main radar antenna.

This invention is an improvement over that used in the past and avoids the problem of spurious beat signals that restrict bandwidth and performance. For example, in the output of a conventional canceller having a bandwidth of 4 mc at 30 mc and using an 18 mc offset frequency, there may appear as many as seven spurious frequencies, each corresponding to a different harmonic combination of signals in the canceller mixers. While the levels of these spurious signals are relatively low and usually tolerable in systems of this bandwidth, any increase in bandwidth as desired in many applications may result in unacceptably high spurious signal levels.

SUMMARY OF THE INVENTION

RF to IF mixing process may be utilized to provide a means of eliminating spurious signals generated between the IF carrier and an offset frequency. A design which effectively transfers two of the three mixers from the main to the auxiliary of omnidirectional channel and eliminates "dog-ear" spurious signals is used in the present invention. Both the STALO (stable local oscillator) and the auxiliary STALO have independent frequency stabilities or are locked together. This relative stability is required by the narrow band integrating filter which may be only 1,000 cycles wide. By controlling the phase and amplitude of the omnidirectional RF to IF mixer, the up shifter and down shifter mixers are eliminated from the main channel.

It is therefore an object of the invention to provide an improved side-lobe canceller.

It is another object to provide a multiple side-lobe canceller having a wide bandwidth.

It is still another object to provide a multiple side-lobe canceller that avoids the problems of spurious beat signals.

These and other advantages, features and objects of the invention will become more apparent from the following description taken in connection with the illustrative embodiment in the accompanying drawings.

DETAILED DESCRIPTION OF THE PREFERRED EMBODIMENT

It is understood that all references to particular frequencies mentioned in the specification and drawings are given for the purposes of example and discussion, and other values may be used that are within the scope of the invention.

Figure 1:
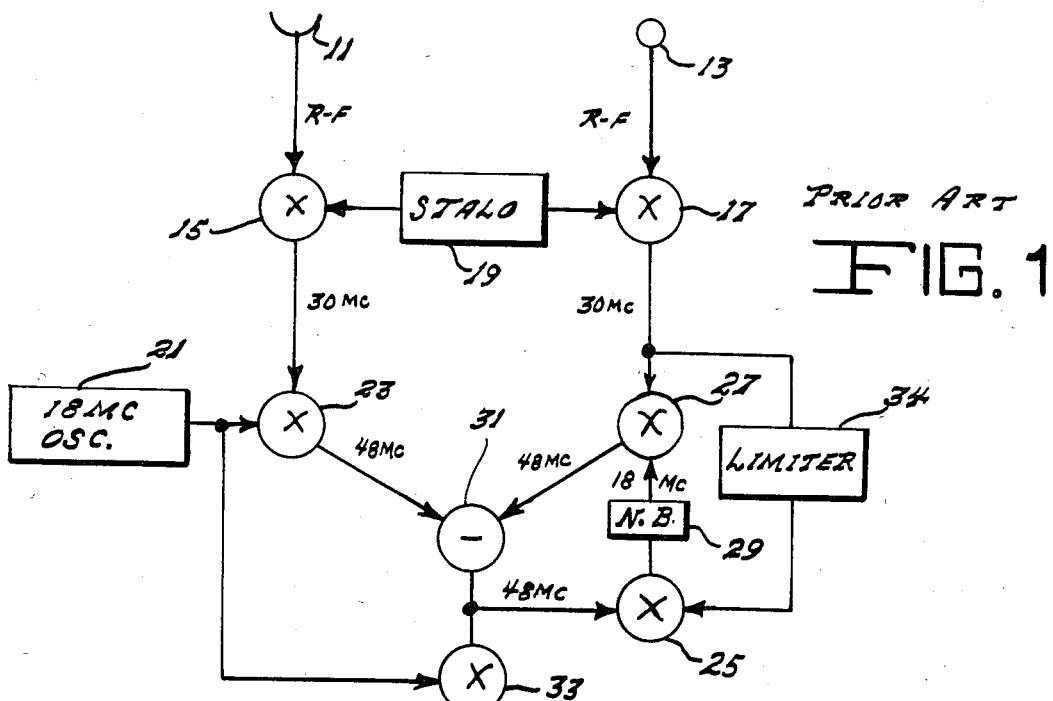
FIG. 1 is a basic form of prior art side-lobe cancellers.

Referring to FIG. 1, there is shown a basic prior art side-lobe canceller, in which radar antenna 11 and omnidirectional antenna 13 feed mixers 15 and 17 together with STALO 19. The output of the main channel is mixed with oscillator 21 in mixer 23 while the output of the auxiliary channel is mixed with the output of mixer 25 in mixer 27 through narrow band filter 29. The difference between the two channels is taken from subtractor 31 and is fed to mixer 25 together with the output of mixer 17 through limiter 34. The output of subtractor 31 and oscillator 21 is then mixed in mixer 33. As thus shown, the previously used side-lobe cancellers have included three mixers in the main channel. The 30 to 48 mc and 48 to 30 mc can cause an estimated loss in noise figure of the main channel in the order of a half db. In addition, undesired spurious signals caused by these mixers appear in the main channel. An example of this is the signal ($32 \times 2 = 64$) minus 18 mc to give 46 mc. This converts to 28 mc in the output and represents an uncancellable residue. Another is ($28 \times 3 = 84$) minus 36 (second harmonic of the LO) that gives 48 which converts to 30 mc.

Figure 2:
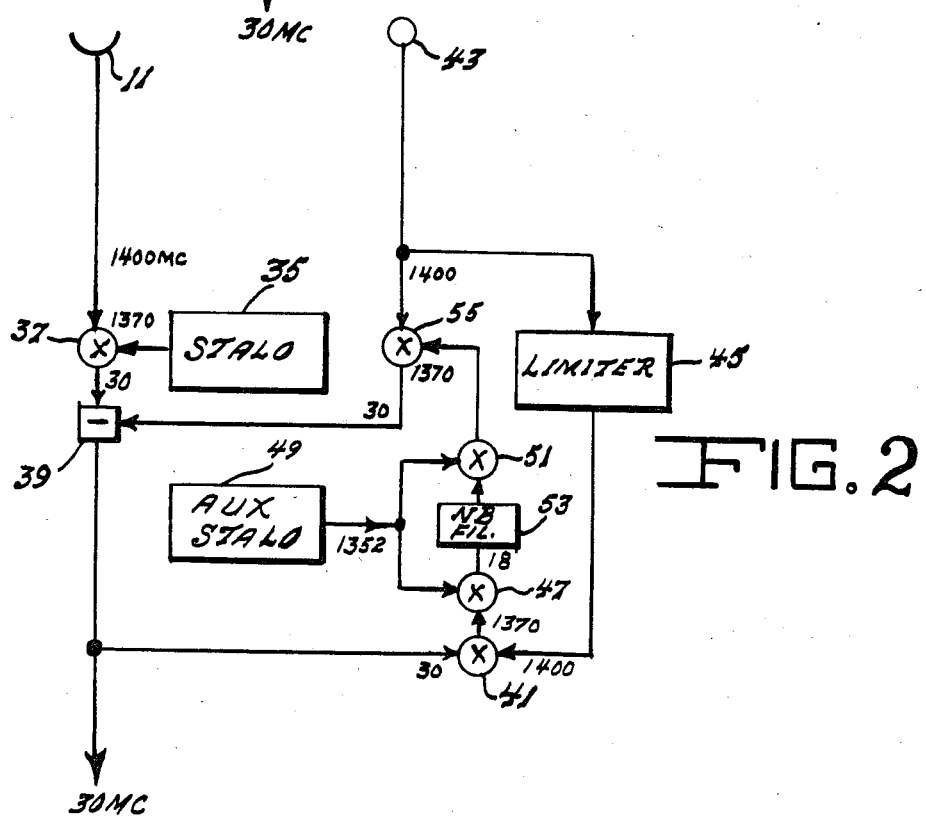
FIG. 2 shows the basic form of the invention which removes two mixers from the main channel.

A design which effectually transfers two of the three mixers from the main to omni channel and eliminates "dog-ear" spurious signals such as those just described are shown in FIG. 2. Both the STALO and auxiliary STALO should have independent frequency stabilities of about $10^{-7}$ (for L band) or else be locked together. This relative stability is required by the narrow band integrating filter which may be only 1000 cycles wide. Here signals from radar antenna 11 and STALO 35 are mixed in mixer 37, the output thereof being one of the inputs to subtractor 39. The output of subtractor 39 is fed to mixer 41 as well as the signal from omnidirectional antenna 43 through limiter 45. The output of mixer 41 is fed to mixer 47 together with the signal from auxiliary STALO 49 which is also fed to mixer 51 to be mixed with the signal from mixer 47 through narrow band filter 53. The output of mixer 51 is mixed in mixer 55 with a signal from antenna 43. The output of mixer 55 constitutes the other input of substractor 39.

Figure 3:
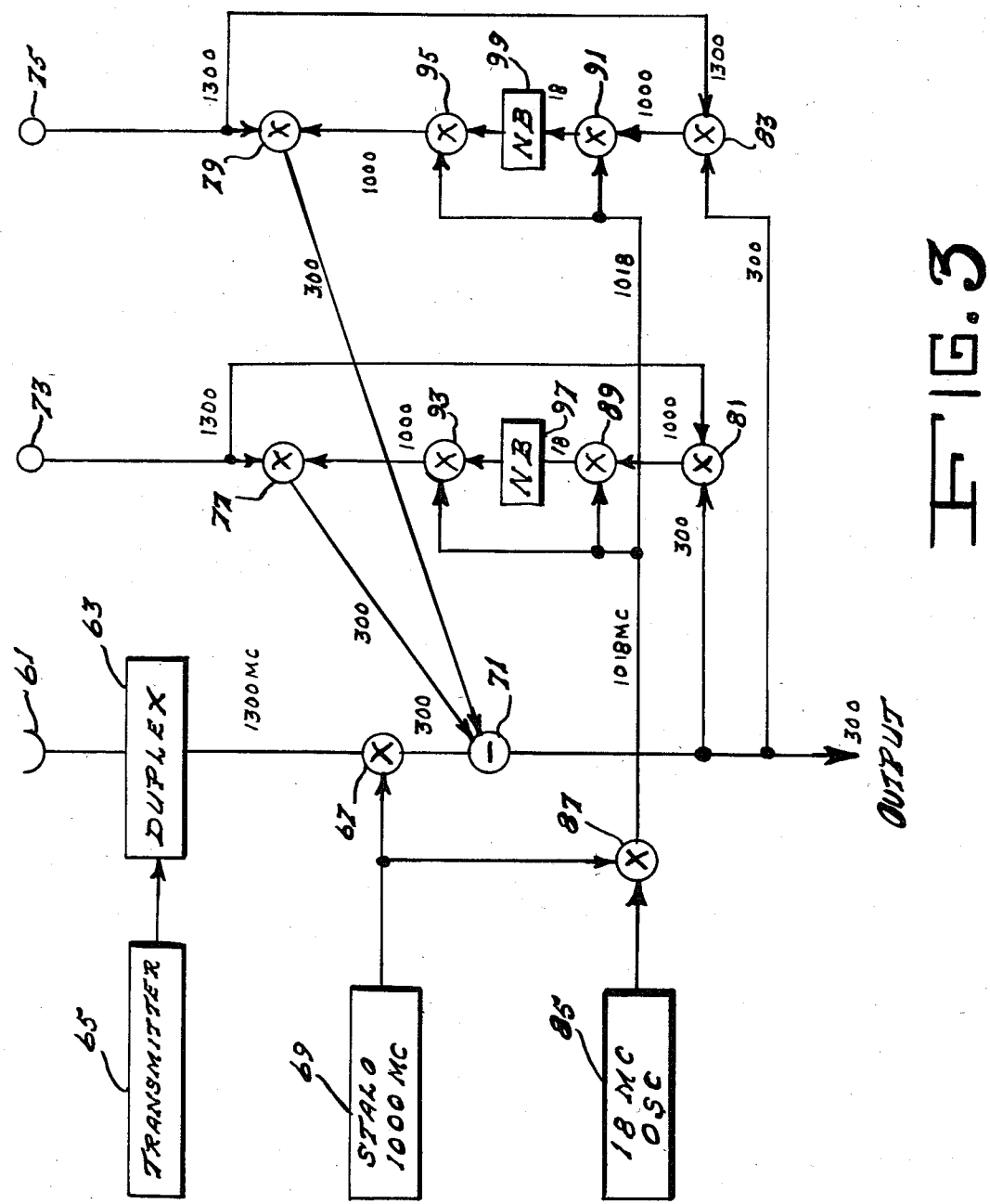
FIG. 3 shows a preferred embodiment of the multiple side-lobe canceller that avoids the problem of spurious beat signals.

A preferred embodiment of the invention is shown in FIG. 3. Here, the signal from radar antenna 61 passes through duplexer 63 which controls the signal from transmitter 65 to mixer 67 which is also fed by STALO 69. The output of mixer 67 constitutes one input of subtractor 71. Omnidirectional antennas 73 and 75 feed one of the inputs to mixers 77 and 79. The output thereof are fed to subtractor 71 whose output is then fed to mixers 81 and 83 together with the signals from antennas 73 and 75. Signals from oscillators 69 and 85 are fed to mixer 87, the output thereof being then fed to mixers 89 and 91 together with the signals from mixers 81 and 83. The output of mixer 87 is mixed in mixers 93 and 95 with the signals from mixers 89 and 91 through narrow band filters 97 and 99. The output of mixers 93 and 95 then constitute the second input to mixers 77 and 79.

By adding the two mixers to the error signal channel it is possible to make use of an 18 mc single pole crystal filter. At the present state of the art these filters are limited to about 70 mc as an upper limit of frequency. By balancing cable lengths or inserting an 18 mc phase shifter in the error channel, the loop can be adjusted to minimize the residue.

What is claimed is:

1. An IF side-lobe canceller comprising:
(a) a main channel including,
   (1) a radar antenna,
   (2) a first local oscillator,
   (3) a first main mixer fed by the radar antenna and the first local oscillator,
   (4) a subtractor to which the output of the first mixer constitutes one input,
   (5) a second local oscillator, and
   (6) a second main mixer fed by the first and second local oscillators, and
(b) a plurality of auxiliary channels, each channel including,
   (1) an omnidirectional antenna,
   (2) a first auxiliary mixer fed by the omnidirectional antenna and the subtractor,
   (3) a second auxiliary mixer fed by the first auxiliary mixer and the second main mixer,
   (4) a third auxiliary mixer fed by the second auxiliary mixer and the second main mixer, and
   (5) a fourth auxiliary mixer fed by the third auxiliary mixer and the omnidirectional antenna, the output of the fourth auxiliary mixer being fed to the subtractor.

2. An IF side-lobe canceller according to claim 1 which further comprises in each auxiliary channel a narrow band filter interposed between the second and third auxiliary mixers.

3. An If side-lobe canceller according to claim 2 which further comprises a duplexer interposed between the radar antenna and the first main mixer.

* * * * *